UNITED STATES PATENT OFFICE.

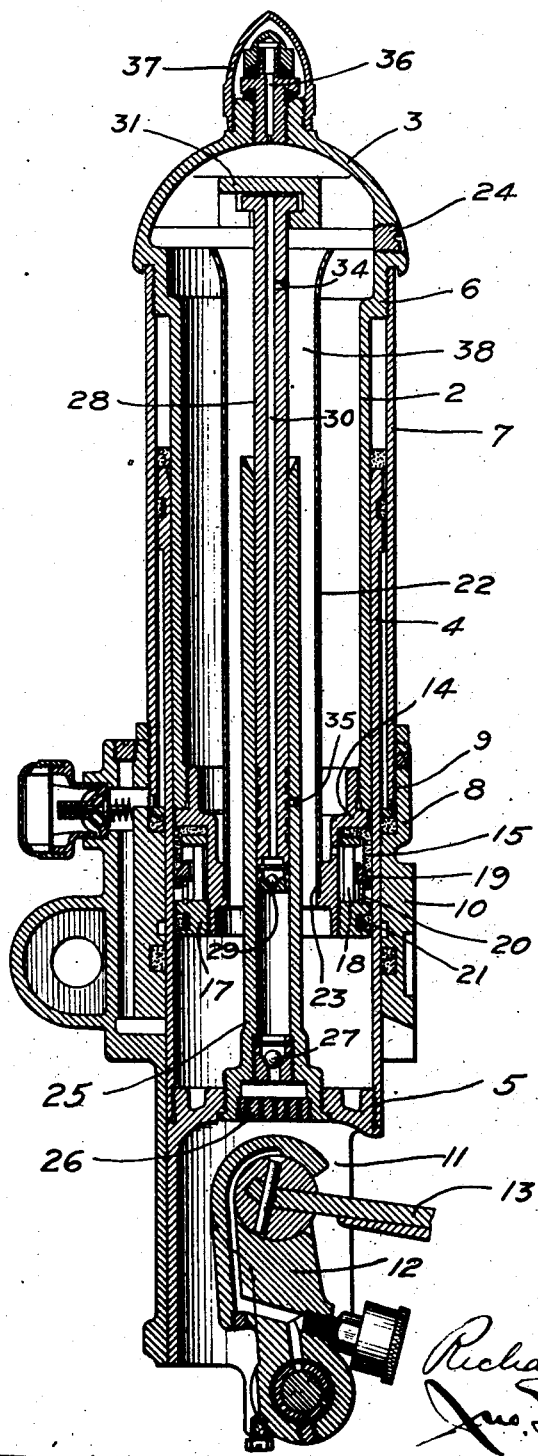

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AUTOMATIC AIR-SPRING.

1,250,475.

Specification of Letters Patent. Patented Dec. 18, 1917.

Application filed May 5, 1914. Serial No. 836,447.

*To all whom it may concern:*

Be it known that I, RICHARD LIEBAU, a citizen of the United States, and a resident of New Haven, in the county of New Haven and State of Connecticut, have made a new and useful Invention in Automatic Air-Springs, of which the following is a specification.

This invention relates to hydropneumatic devices of the type set forth in several applications for patent filed by me and in Letters Patent No. 1,036,043, issued to George Westinghouse on August 20, 1912.

In the present case, as in former cases, the invention is embodied in a fluid compression device adapted for use as a compression spring and applicable in any relation where two bodies are so associated that resilient support is desirable; and the general object in view in this, as well as in the former cases, has been to embody the principle of resilient support by an elastic compression medium such as air or gas in a commercially practical self-contained air-tight compression device adapted to serve all the purposes and functions of a spring.

My present invention also resembles that of the said former applications and patent in so far as a fluid-tight joint between the sliding surfaces is maintained by means of a liquid bath.

According to my present invention, which is particularly applicable to motor vehicles such as automobiles, delivery wagons, trucks, etc., (and which hereinafter without any idea of limiting the invention will be referred to as an air spring), means are provided for forcing air into the chamber of the spring and also for automatically determining the normal or operative relative positions of the relatively movable members of the spring irrespective of the load carried thereby.

It has been found in using air springs on motor vehicles, such as automobiles, trucks, etc., that it is desirable to have the air springs so adjusted that under normal conditions, when the vehicle is at rest, the air springs will stand in about mid position, that is, that they will stand about one-half compressed in order that substantially equal movement may be had above and below this mid or normal position.

It has been found in practice with most of the devices of said prior applications in which a pump was utilized for returning to the interior of the spring the oil passing the sliding joint, that under certain conditions a certain amount of air from the oil-collecting chamber is pumped with the oil, thereby raising the pressure in the spring and changing the normal running position to a more extended position than is desirable. In use on a motor vehicle, it is desirable to have the air springs so adjusted that the load platform of the vehicle, when the vehicle is at rest, normally stands at a certain height from the ground, or, in other words, it is desired to maintain the load platform at a certain height from the ground, so as to allow the running gear of the vehicle to move up and down when the vehicle is in use.

In certain forms, as before said, of the prior devices, it has been found that under certain conditions so much air is pumped into the interior of the springs by means of the oil pump that the air pressure within the springs has been increased so that the load platform has been raised above its normal position.

According to my present invention, I make use of the idea of pumping air into the air springs but provide means for automatically determining the normal or operative positions of the relatively movable members of the air springs irrespective of the load carried by the load-carrying platform.

An object of this invention is to produce an air spring in which means are provided for forcing air into the chamber of the spring and for providing means for automatically determining the normal or operative relative positions of the relatively movable members of the air springs irrespective of the load carried by the load-carrying platform of the vehicle with which they are utilized. This, as well as other objects which will readily appear to those skilled in this art, I attain in the device described in the specification and illustrated in the single sheet of drawings accompanying the same.

The drawing is a sectional elevation of an air spring embodying this invention. In the device, the cushion chamber is made up of a cylinder 2 provided with a head 3 and which telescopes within a cylinder 4 having a bottom 5 formed in the nature of a crosshead. Secured to head 3 at 6 is an outer cylinder 7 which acts as a cover, or mud or dust guard and which is threaded within a spring guide member 8 at 9. The guide member has a machined face 10 which may be bolted or otherwise secured to a corresponding face of a bracket, adapted to be rigidly bolted or riveted to the chassis or frame of the vehicle.

The crosshead 11 formed on the cylinder bottom 5 is adapted to be shackled by means of a shackle 12 to one end of the steel leaf spring 13 forming part of the running gear of the vehicle. The air spring, it will be seen, is adapted to work in series with the steel spring, and if an air spring is mounted on each corner of the chassis or frame and properly connected up to the steel springs, the chassis will be supported on four air cushions operating in series with the steel springs.

Threaded to the lower end of cylinder 2 is a plunger head 14 which carries a cup-leather packing 15 for the telescoping or sliding joint between the cylinders 2 and cylinder 4. A seat is formed for the cup-leather packing and the packing is firmly held to said seat by means of a nut 17 threaded to the lower end of the plunger head and which is provided with an upright extension 18 which clamps the cup-leather to its seat 16. A cone expander ring 19 is pressed against the inner depending lip of the cup-leather packing by means of a spring 20 which lies between said expander and the nut 17.

A spring-backed leather wiper ring 21 bears against the inner surface of cylinder 4 and serves to retain oil or other sealing liquid in the chamber which contains the cup-leather packing.

The depending flange of the cup-leather packing bears against the inner surface of cylinder 4 and the chamber containing the packing is in open communication with a reservoir formed by a tubular element 22 threaded into plunger head 14 at 23. The reservoir is formed between cylinder 2 and element 22 and is adapted to be filled with oil through a charging plug 24 threaded into head 3.

A tubular member 25 forming a pump cylinder is threaded into bottom 5 and contains an air strainer 26 and a non-return ball check valve 27. A pump plunger 28 carrying a non-return ball check valve 29 and provided with a bore 30 throughout its length is more or less loosely secured (to allow lateral adjustment) within a retainer 31 carried by head 3. This pump plunger is provided with an outlet port 34, and the tubular member 25 is provided with a regulating port 35. An air charging valve 36 is threaded into the top central portion of head 3 and a dust cap 37 covers the valve and is threaded onto a boss formed on the head 3.

In use, the air spring will be charged with oil or other sealing liquid through the charging plug 24 until the reservoir is filled. After the charging plug has been replaced air will be forced in through valve 36 until the relatively movable members of the spring stand in their normal operative positions.

Assume that the load on the spring is such that when not in action the relatively movable members will stand in the position shown in the drawing. During action, then, when the spring is compressed and extended, air will be pumped in by means of the pump through strainer 26 past ball check valve 27 and will flow up through tubular member 25 through the opening 30 in the plunger and out through outlet port 34 into the interior of the device, and this will take place until the spring has been distended while at rest until the lower end of plunger 28 is above or in line with regulating outlet 35. It will be seen that when the lower end of plunger 28 passes up above regulating outlet 35 no air will be drawn into the pump plunger through strainer 26. The pump will only operate while the lower end of plunger 28 is below regulating outlet 35. The regulating outlet 35, therefore, determines the normal or operative relative positions of the relatively movable members, and it will be seen that it will do this irrespective of the load carried by the spring.

It will pump air into itself until it is distended so that the pump is rendered inoperative as an air pump. If air leaks past the cup leather packing, which it cannot do until all of the oil from the reservoir has passed the cup-leather packing, the air pump will take care of the leakage and bring the spring back to its normal operative position. If the load is increased on the spring and it is depressed or collapsed below its normal operative position, the air pump will immediately become effective and increase the pressure within the device until the spring again stands at its normal operative position.

The space 38, which is the space between the tube 22 and the pump cylinder 25 forms a transfer passage for air during the compression and extension movements of the air spring. The oil which leaks past the cup-leather packing will serve to keep the sliding surfaces properly lubricated. The reservoir is of such capacity that with the small leakage past the cup-leather packing, it will be sufficient to supply the cup-leather packing with oil for a considerable length of time. As the oil leaks out, the volumetric capacity for air in the spring will increase, but the air pump will automatically fill this increased space with air.

In accordance with the provisions of the patent statutes, I have described the principle of operation of my invention, together with the device which I now consider to represent the best embodiment thereof, but I desire to have it understood that the device shown is only illustrative and that the invention can be carried out in other ways.

What I claim is:

1. A cushioning device comprising relatively movable members forming a chamber and having a sliding joint therebetween to permit variations in the volumetric capacity of the chamber, means located within the chamber and actuated by variations in the relative positions of said members for forcing fluid under pressure into said chamber, and means for determining the relative positions of said members, irrespective of the fluid pressure within said chamber, by rendering said fluid forcing means inoperative when said members assume a determined position.

2. A cushioning device comprising relatively movable members forming a chamber of variable volumetric capacity, a pump located within said chamber and actuated by the relative motion of said members for forcing air into said chamber and means independent of the pressure within said chamber for rendering said pump inoperative when said members assume a determined relative position.

3. A cushioning device, comprising relatively movable members inclosing a chamber of variable volumetric capacity, a pump located within said chamber for receiving fluid from without the chamber and for forcing fluid into the chamber, and means independent of the pressure within the chamber for placing the interior of the pump in direct communication with the chamber when said members assume a determined position.

4. A cushioning device for vehicles comprising relatively movable members located between the body and the running gear and inclosing a chamber of variable volumetric capacity, means located within the chamber and actuated by the relative motion of said members for forcing fluid from an external source into said chamber and means independent of the pressure within the chamber and controlled by the relative positions of said members for limiting the degree of pressure pumped by said fluid forcing means into said chamber.

5. A cushioning device for a vehicle, comprising relatively movable members located between the body and the running gear of the vehicle and inclosing a chamber of variable volumetric capacity, a pump actuated by the relative motion of said members for forcing fluid from an external source into said chamber, and means independent of the fluid pressure within the chamber and controlled by the relative positions of said members for limiting the degree of pressure pumped by said pump into said chamber.

6. A cushioning device for a vehicle, comprising relatively movable members located between the body and the running gear of the vehicle and inclosing a chamber of variable volumetric capacity, a pump operating upon the extension and compression movements of said members and comprising a piston and a coöperating cylinder provided with an inlet valve receiving fluid from an external source and an outlet valve for delivering fluid to said chamber, and a port in the pump cylinder controlled by the relative positions of said members for rendering said pump inoperative as a pumping agent when said members occupy a determined position.

7. A cushioning device for a vehicle, comprising relatively movable members located between the body and the running gear of the vehicle and inclosing a chamber of variable volumetric capacity, a pump located within the chamber and comprising a plunger, operatively connected to one of said members, a coöperating piston operatively connected to the other member, an inlet valve controlling an inlet port formed in the cylinder, and a discharge valve controlling a passage formed within the plunger and communicating with said chamber, and a port located in said cylinder and controlled by said piston and adapted to establish direct communication between the chamber and the interior of the cylinder when the members assume a determined relative position.

8. A cushioning device comprising two relatively movable members inclosing a chamber of variable volumetric capacity, a pump located within said chamber, one member of said pump being operatively connected to one of said relatively movable members and the other member of the pump being operatively connected to the other relatively movable member, and means dependent on the relative positions of said relatively movable members and independent of the pressure within the chamber for limiting the degree of pressure within the chamber by rendering said pump inoperative.

9. A cushioning device, comprising two relatively movable members inclosing a chamber of variable volumetric capacity, a sliding joint between said members, a packing for said joint, a reservoir located within said chamber for delivering sealing liquid to said joint, a pump comprising a cylinder mounted on one member, a pump plunger mounted on the other member, and inlet and outlet valves, for drawing fluid from an external source and for forcing it into said chamber, and a port formed in said cylinder for establishing direct communication between the interior thereof and said chamber when said plunger is moved to a determined position.

10. A cushioning device comprising relatively movable members inclosing a chamber of variable volumetric capacity, a pump located within said chamber for forcing fluid from an external source into said chamber, and means independent of the pressure within said chamber for limiting the degree of pressure pumped by said pump without venting said chamber.

11. A cushioning device comprising relatively movable members, inclosing a chamber of variable volumetric capacity, a plunger head carried by one of said members and located intermediate the ends of said chamber and having a passage formed therethrough for establishing free communication between the ends of the chamber located on opposite sides thereof, a packing for the sliding joint between said members located on said head, a tubular element mounted on said head, and forming an annular reservoir above said head for delivering liquid to said packing, and an air pump concentrically arranged within said chamber and extending through the passage in said head and having an inlet communicating with the atmosphere and an outlet communicating with said chamber.

12. In a cushion device comprising relatively movable members forming a chamber having a sliding joint therebetween, a plunger head carried by one of said members, a passage through said head establishing free communication between the top and bottom of said chamber on opposite sides thereof, an air pump concentrically arranged within said chamber having its inlet communicating with the atmosphere and its outlet with said chamber and means independent of the pressure within said chamber for limiting the degree of pressure pumped by said pump without venting said chamber.

In testimony whereof I have hereunto subscribed my name this 29th day of April, 1914.

RICHARD LIEBAU.

Witnesses:
  ARTHUR H. KINNEY,
  GRACE E. FISHER.